United States Patent [19]
Fader

[11] 3,891,305
[45] June 24, 1975

[54] APPARATUS FOR SIMULATING A THREE-DIMENSIONAL IMAGE BY USE OF PLURAL IMAGE PRODUCING SURFACES

[76] Inventor: Lester Fader, 1402 Bardstown, Ann Arbor, Mich. 48105

[22] Filed: May 8, 1973

[21] Appl. No.: 358,322

[52] U.S. Cl. .............................................. 350/144
[51] Int. Cl. ......................................... G02b 27/22
[58] Field of Search ............ 350/130, 132, 144, 131

[56] References Cited
UNITED STATES PATENTS

| | | | |
|---|---|---|---|
| 2,268,351 | 12/1941 | Tanaka | 350/144 X |
| 2,281,101 | 4/1942 | Land | 350/132 |
| 2,514,814 | 7/1950 | Towne | 350/131 |
| 2,961,486 | 11/1960 | Marks | 178/6.5 |
| 3,478,242 | 11/1969 | Ciccotto | 178/6.5 |
| 3,555,349 | 1/1971 | Munz | 178/6.5 |
| 3,582,961 | 6/1971 | Shindo | 350/131 X |
| 3,666,465 | 5/1972 | Winnek | 350/131 X |
| 3,776,725 | 12/1973 | McCann et al. | 350/132 X |

Primary Examiner—Paul A. Sacher
Attorney, Agent, or Firm—Charles M. Leedom

[57] ABSTRACT

Apparatus and method for forming a pseudostereoscopic image by providing two or more light image forming means arranged in parallel spaced, axially aligned position wherein the forward image forming means is adapted to transmit and modify the light image formed by the rear image forming means to produce a three dimensional sensation. In one embodiment, the rearward image forming means includes one or more continuous tone film transparencies in either color or black and white and the forward image forming means is formed of one or more line gradient or half-tone film transparencies wherein the film transparencies are mounted in spaced relationship to form a film composite having stereoscopic characteristics. In yet another embodiment, each light image forming means includes a light emitting surface having a layer of material responsive to electron beam or electronic circuit excitation to produce identical light patterns which when preceived as a composite produce a three dimensional sensation.

16 Claims, 10 Drawing Figures

PATENTED JUN 24 1975 3,891,305
SHEET 1
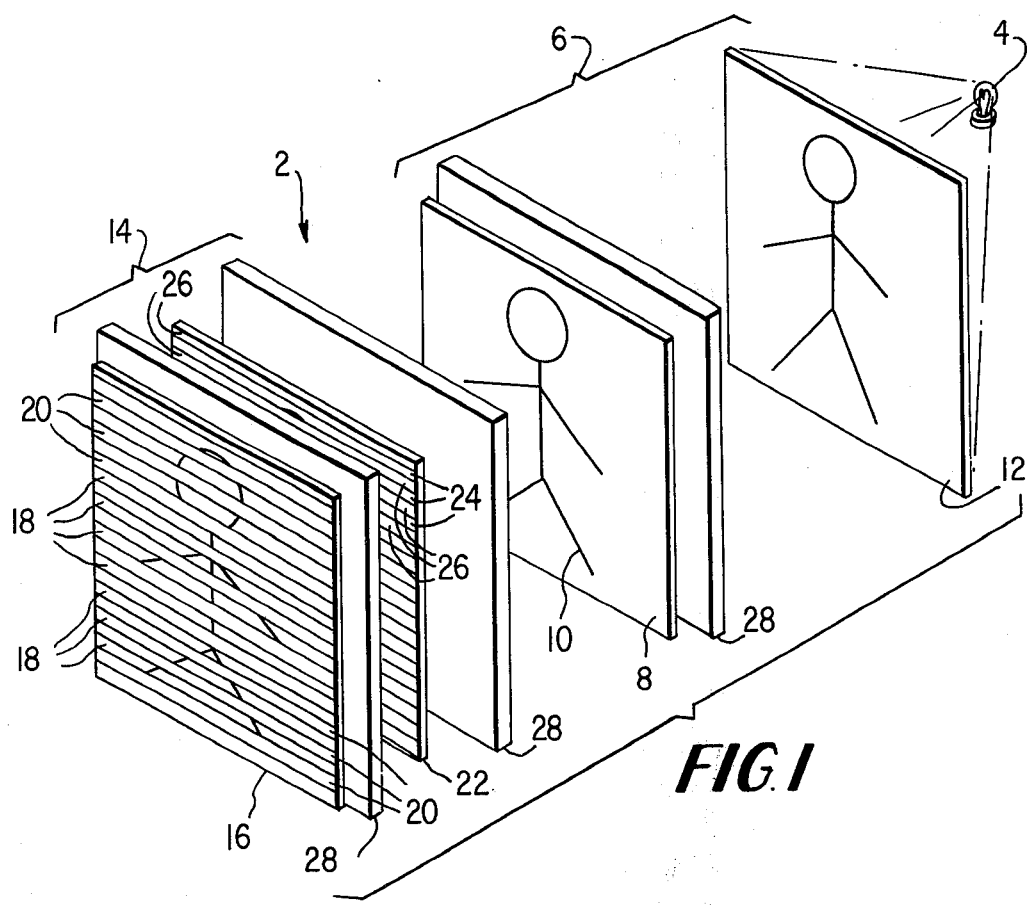
FIG.1
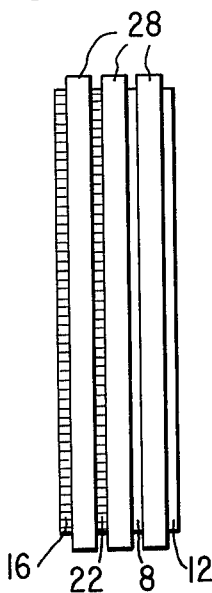 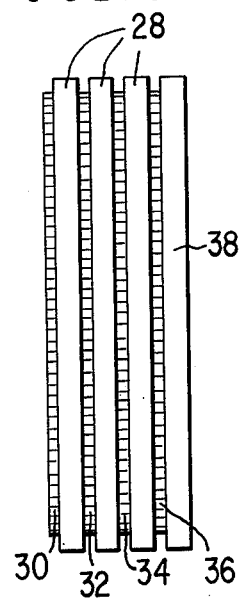 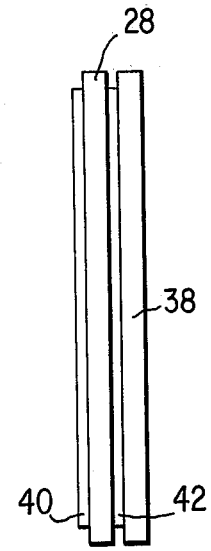 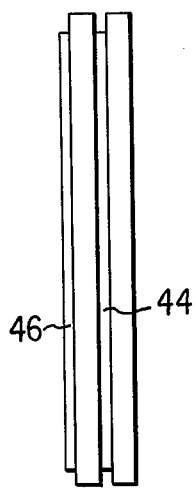
FIG.2  FIG.3  FIG.4  FIG.5

APPARATUS FOR SIMULATING A THREE-DIMENSIONAL IMAGE BY USE OF PLURAL IMAGE PRODUCING SURFACES

BACKGROUND OF THE INVENTION

1. Field of the Invention

This invention relates generally to an apparatus and method for creating a light image having three dimensional characteristics.

2. Description of the Prior Art

The illusion of three dimensions in the usual two dimensional black and white printed image is created by a variety of visual cues such as relative size, overlap, density and perspective of objects contained in the print. In color prints and color slide projections, an additional cue exists (i.e., color) which assists in creating an illusion of three dimensions by relating the image to prior real world color observations known to the viewer. Further improvement in three dimensional image illusion has generally necessitated the creation of two separate images taken from laterally separated vantage points (corresponding to the distances between a viewer's eyes). The separate images are subsequently reconstructed and presented to each eye of a viewer. Examples of prior art devices capable of producing separate images include polarized lenses for passing left and right polarized images; steropticon viewers for producing physically separated left and right images; and lenticular lenses placed over a two dimensional image to produce a three dimensional effect. The first two techniques have proved to be impractical in certain circumstances due to inconvenience and high cost. The lenticular lense approach, while overcoming these drawbacks to some degree, produces an image of questionable quality.

One attempt to solve the above noted disadvantages is disclosed in U.S. Pat. No. 3,582,961, issued June 1, 1971, to Shindo which discloses a system for creating a three dimensional illusion in a two dimensional picture. The fundamental principle of the Shindo disclosure is based on the use of a striped pattern having a plurality of vertical or oblique lines along the boundary line at the ends of the picture. While the Shindo patent is suitable for the purposes intended, the center portion of a picture displayed in accordance with the Shindo patent still retains a flat two dimensional appearance since the center area of the picture is remote from the striped boundary.

Another attempt to solve the problem of providing a three dimensional effect without special viewers, polarizers or lenticular lenses is disclosed in U.S. Pat. No. 3,478,242 issued November 11, 1969 to Ciccotto. The Ciccotto patent discloses a cathode ray tube including a single electron gun and a pair of separated parallel image receiving screens wherein alternate areas of each screen are scanned by the electron gun to reproduce images recorded from two separate camera positions. While the Cicotto apparatus is suitable for the purposes intended, it will not operate with a conventional video signal and would require modification of the entire system of television broadcast presently in use.

SUMMARY OF THE INVENTION

The primary purpose of this invention is to provide a light image which is capable of producing a distinct three dimensional sensation without the drawbacks of the prior art discussed above. Pursuant to this purpose, one embodiment of this invention includes a first image producing means for directing a first light pattern corresponding to a desired image toward a viewing area and a second image producing means for directing a second light pattern substantially identical to the first light pattern toward the same viewing area, whereby a three dimensional sensation is created when the first and second image patterns are visually integrated by an observer positioned within the viewing area. The first image producing means includes a first generally planar light emitting surface. The second image producing means includes a second and/or third generally planar light emitting surface parallel to and positioned forward of and in exact axial alignment with said first generally planar light emitting surface. To permit all image patterns to be perceived, the second and/or third planar light emitting surface or surfaces are adapted to allow the first light pattern to pass therethrough to the predetermined viewing area.

Another object of the invention is to provide apparatus for producing a pseudostereoscopic light image having the characteristics noted above wherein the first and second light emitting surfaces include means responsive to electronic beam excitation to produce a light image. Such means may take the form of photoemissive material responsive to electron beam excitation or flat screens of liquid crystal or gas pockel responsive to electronic circuit control to produce an image. In any case, the light emitting surfaces are adapted to be excited by the same video signal to produce identical light images. The forward light emitting surfaces are transparent to the light images produced by the rearwardly positioned surfaces.

Still another object of this invention is to provide apparatus having two or more light emitting surfaces responsive to electron beam excitation wherein all screens forward of the rearmost screen contain a half tone phosphor coating with clear areas over the remaining surface. Furthermore, all screens behind the forward most screen are perforated to permit electron beam penetration to the forward screens. Liquid crystal or gas pockel flat screens may also be substituted for all or the foreward most screens. The spacing between the light emitting surfaces determines the viewing angle and the preferred spacing is between one-eighth and one-half inches.

In another embodiment of the subject invention, a composite pseudostereoscopic film transparency is provided including first means for forming a light pattern containing visual information in two dimensional form of the desired image and second means for modifying the image created by the first means to produce a three dimensional image sensation wherein the second means includes at least one line gradient film transparency image containing a plurality of spaced stripes arranged to create a three dimensional sensation. The first means includes a first film transparency positioned within a light beam and contains a two dimensional reproduction of the desired image recorded from a first predetermined position. The line gradient film transparency in the second means is parallel to and positioned forward of and in actual alignment with the first film transparency wherein the line gradient film transparency is adapted to permit the light passing through the first film transparency to pass through the line gradient film transparency. Similar stereoscopic effects may be achieved by employing half tone film transparency images to form the second means.

It is the further object of this invention to provide a composite pseudostereoscopic film transparency wherein the first means for forming a light pattern includes one or two color or black and white continuous tone film transparencies and the second means may include one or two line gradient or half-tone film transparencies.

Yet another object of the subject invention is to provide a composite pseudostereoscopic film transparency in which the second means includes a first and second line gradient film transparencies containing a plurality of spaced strips. Each strip contained in one film transparency contains visual information identical to the visual information contained in corresponding areas of a two dimensional reproduction of the desired image recorded from a first predetermined position. In contrast thereto, each strip of the other film transparency contains visual information identical with the visual information contained in corresponding areas of a two dimensional reproduction of the desired image recorded from a second predetermined position laterally displaced with respect to the first predetermined position. The second means may include half-tone images rather than line gradient film transparencies.

Still another object of this invention is to provide a method for forming a pseudostereoscopic image display of a photographic scene comprising the steps of forming a first film transparency of the scene; forming a second film transparency having at least selected portions which are identical with corresponding portions of a first film transparency; projecting the first film transparency onto a spaced, parallel, axially aligned translucent screen relative to the second film transparency and projecting light through the first and second film transparencies whereby a viewer receives a three dimensional sensation.

Other objects, features, and advantages of the invention will become apparent from the following drawings, description and claims.

BRIEF DESCRIPTION OF THE DRAWINGS

FIG. 1 is an exploded perspective view of a composite pseudostereoscopic film transparency in accordance with the subject invention;

FIG. 2 is a side elevational view of the composite film transparency disclosed in FIG. 1;

FIG. 3 is a side elevational view of a composite film transparency including four separate line gradient film transparencies;

FIG. 4 is a side elevational view of a composite film transparency including two continuous tone film transparencies;

FIG. 5 is a side elevational view of a composite film transparency including a continuous tone transparency in combination with a half tone film transparency;

DESCRIPTION OF THE PREFERRED EMBODIMENT

Figure 6:
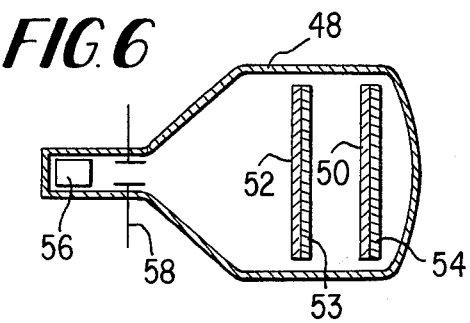
FIG. 6 is a cross-sectional view of a television tube including a display screen arranged in accordance with the subject invention.

With reference to FIG. 1, a composite pseudostereoscopic film transparency 2 is disclosed. The word "pseudostereoscopic" refers to the characteristic of the subject apparatus wherein the sensation of three dimensions is perceived by a person viewing the film transparency from a predetermined position without the necessity of creating two completely separate left and right images.

The composite pseudostereoscopic film transparency of FIG. 1 includes first means 6 for forming a light pattern containing visual information in two dimensional form of the desired image. The first image forming means 6 includes at least one film transparency 8 positioned within the light beam formed by the light means wherein the film transparency contains a two dimensional reproduction 10 of the desired image recorded from a first predetermined position. For added effect, the first means 6 may also include a second film transparency 12 substantially identical with the first film transparency 8. Light means 4 is provided for directing a beam of light toward a predetermined viewing area. The light means 4 may comprise any conventional source of light such as an incandescent bulb, a fluorescent light or natural daylight.

Transparencies 8 and 12 may be in color or black and white and when used together are produced at less than normal density and contrast. To obtain such densities, each transparency may be exposed and processed with appropriate color correcting filters to compensate for color shift. The usual films used include Kodak Ektachrome for tungsten light or Ektachrome daylight which require different filters to accommodate minor color shifts.

Second means 14 are provided for modifying the light image created by the first means thereby to produce a three dimensional image sensation. The second means includes at least one line gradient film transparency 16 containing a plurality of spaced strips 18 wherein each strip contains visual information identical to the visual information contained in corresponding areas of the first film transparency 8. Interspersed between strips 18 are transparent strip-like areas 20. A second line gradient film transparent 22 may be provided including a plurality of spaced strips 24 containing visual information identical with visual information contained in corresponding areas of a two dimensional reproduction of the desired image recorded from an identical or second predetermined position laterally displaced with respect to the first predetermined position from which the first film transparency 8 is recorded. Interspersed between strips 24 containing visual information are transparent strips or areas 26 similar to the transparent strips or areas 20 of the line gradient film transparency 16.

The line gradient or half-tone film transparencies are formed by first obtaining black and white or color negatives of normal density and contrast. As indicated above, one negative is recorded from a first predetermined position with respect to the desired scene and another negative may be obtained by recording the same scene from a laterally displaced position corresponding to the spacing between the eyes of a viewer. A Zip-A-Tone line screen of 48 lines per inch formed by equally spaced translucent and opaque strips is next affixed to heavy gauge clean acetate. The line screen and acetate are assembled with one of the original negatives and Kodak Kodalith Ortho Type 3 or similar film to form an exposure composite with the line screen or half-tone screen on top (closest to a source of exposure light) followed by the film negative and finally the unexposed Kodalith film. A test exposure is made (by the step wedge method) and the Kodalith test exposure is developed in Kodak HC-110 dilution "D" or similar developer for 2 to 5 minutes. By this method, a low density, low contrast positive transparency is produced having the appropriate tone selection. This process results in a line gradient film transparency having 30–50 lines per inch of alternating visual information strips 24 and transparent strips 26 depending on the final size of the transparency.

The composite pseudostereoscopic film transparency disclosed in FIG. 1 further includes a plurality of clean plexiglass sheets 28 interspersed between each film transparency to maintain the transparencies parallel to and in axial alignment with each other. The thickness of the plexiglass may be varied to control the spacing between the transparencies. A spacing of between one-eighth to one-fourth inch appears to produce optimal pseudostereopsis and optimal cone of vision.

The densities of the various layers of the composite film transparency are controlled to produce an additive density equal to what would approximate a normal viewing density for a single layer transparency. The line gradient may be arranged vertically or horizontally with respect to the viewer. When trans-illuminated from behind by an artificial light source such as source 4 and viewed from a forward position, the composite transparency provides an image of reinforced realism including a three dimensional sensation similar to a well structured stereogram.

FIG. 2 discloses a side elevational view of the composite transparency of FIG. 1 wherein the various layers have been brought into contacting relationship. In this composite form the transparency may be mounted in any suitable manner such as a picture matting which permits rear illumination to pass therethrough.

FIG. 3 discloses a modification of the composite transparency in FIGS. 1 and 2 wherein all four transparencies 30, 32, 34, 36 are line gradient transparencies similar to the line gradient transparencies of FIG. 1. The process for obtaining transparencies 30, 32, 34, 36 is, however, modified as follows. Two original negatives are obtained by photographically recording the desired scene from two laterally spaced camera positions, wherein the right negative is taken through a green filter. As previously described, each negative is used to produce a pair of line gradient positive transparencies with one negative being less dense than the other. All four line gradient positive transparencies are assembled with ⅛ inch thick plexiglass sheets 28 to form a composite transparency having the most dense line gradient transparencies at the back and the less dense at the front closest to the viewer. All images are visually aligned for depth and overlap to obtain optimum three dimensional sensation. A low density sheet of white plexiglass 38 may be provided at the rear of the composite transparency to diffuse the light from light source 4.

Referring now to FIG. 4, yet another embodiment of the subject invention is disclosed wherein a pseudostereoscopic effect is obtained by employing two black and white continuous tone film transparencies arranged on either side of a sheet of clear plexiglass 28 of a predetermined surface to surface spacing of one-eighth to one-half inch, preferably one-eighth of an inch. A white plexiglass sheet 38 may also be provided as disclosed in FIG. 3. The embodiment of FIG. 4 employs the principle that a three dimensional sensation may be obtained from a rear illuminated multi-layered apparatus wherein the layers have identical visual information patterns. —40–50

With reference to FIG. 5, a composite transparency is disclosed including a continuous tone color or black and white transparency 44 and a half-tone screened transparency 46. Additional half-tone transparencies may be included, arranged and positioned as described above.

Such arrangements of film transparencies as illustrated in FIGS. 1–5 give rise to viewing conditions of parallax, visual accommodation, scanning and textural gradient interpretation which are among the optical conditions leading to a sensation of three dimensions. Even though desirable, discrete left and right images are only part of the optical and perceptual conditions possible for creating a stereoscopic perception. By axially spacing two or more identical images as described above, an observer will optically and perceptually integrate the images in a manner giving rise to a sensation of three dimensions or reinforced realism.

Numerous methods may be employed to form the various composite transparencies described above. For example, one which has been successfully employed may be used when the final composite transparencies are to be the same size as the original camera image. In accordance with this method, an original color transparency is recorded of a scene and is developed as a positive transparency to be embodied in the final composite assembly. The color transparency is formed with slightly less than normal density. The second image is recorded on black and white film negative material which has the same size as the color positive. The image is recorded from the same camera position as the color transparency or, in the alternative, may be recorded from a position laterally displayed from the position of which the color image was recorded. The black and white negative is developed to normal density and less than normal contrast. The negative is contact printed with an overlaid half-tone screen (preferably having 40–50 lines per inch) on a high-contrast copy film such as Kodalith Ortho or Panchromatic film.

The half-tone film is developed for low contrast low density positive transparency with a developer such as Kodak HC-110, Delution "D" or similar characteristic solutions. The photographic transparencies thus produced are assembled into a single composite with ⅛ inch plexiglass as illustrated in FIGS. 1–5.

The method described above may be employed to produce assembled composite transparencies including a primary positive continuous tone color or black and white transparency with a single or plurality of half-toned screened positive transparencies of less than normal density and contrast. All image transparencies are of identical size and are axially aligned into a single composite spaced with clear plexiglass.

To produce final composite transparencies of any required size, another method has been successfully employed wherein a single color negative is employed to record a scene from a predetermined position and is developed to normal density and contrast. Thereafter the color negative is enlarged by projection onto color print film (Kodak Ektacolor or similar print film) and is developed to normal contrast and slightly less than normal density. The original color negative is also enlarged to the same size as the color print film but projected onto black and white Panchromatic copy film to an overlaid half-tone line screen (30 to 50 lines per inch depending on the image size, preferably 48 lines per inch). One or more half-tone black and white transparencies are produced and developed with less than normal density and contrast such that all assembled color and black and white composite transparencies have an additive total density approximating normal light transmission value. As in the previous method, the positive enlarged color transparency and the black and white line tone transparencies of graded total density are mounted with ⅛ inch thick clear plexiglass to produce the final composite transparency. This method is preferred since it allows the greatest flexibility.

Alternate composite assemblies are possible such as one positive color transparency and one continuous tone black and white of less than normal density. The composite may also be formed of one positive color transparency with a second color positive transparency of less density in direct contact therewith and one or more line tone black and white positive transparencies spaced and density controlled as previously described. A proper mix of both continuous tone and half-tone transparencies properly spaced and controlled in additive density can produce a composite that displays reinforced depth (pseudostereoscopic) characteristics. A lined half-tone image is preferred as the integral transparencies in the composite image but other half-tone screening procedures will also produce the desired effect.

Figure 7:
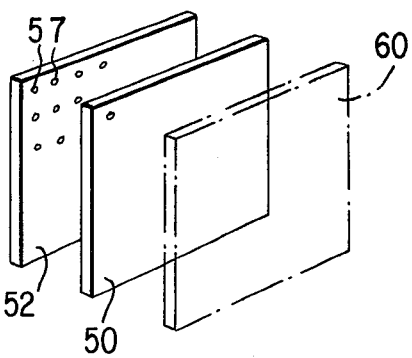
FIG. 7 is a isometric view of the display screen disclosed in FIG. 6.
Figure 8:
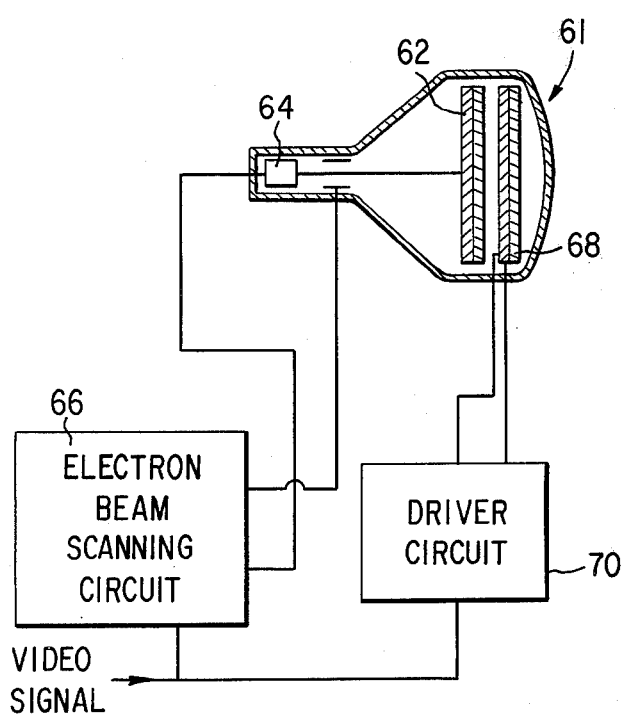
FIG. 8 is a cross-sectional view of another embodiment of the subject invention including an electronically activated flat screen.

The principles employed in the specific embodiments of FIGS. 1-5 may also be applied to a television display as disclosed in FIGS. 6, 7 and 8. The television cathode ray tube 48 disclosed in FIG. 6 includes a pair of light emitting surfaces 50, 52. Surface 50 is formed with a half-tone phosphor screen 54 (having either a line gradient or a dot configuration). Surface 50 also includes clear areas between the phosphor to permit the image from surface 52 to be viewed. Surface 52 is formed with a continuous tone phosphor screen 53. Television tube 48 includes cathode means 56 for forming a single electron beam and scanning means 58 for causing the electron beam to simultaneously scan the first and light emitting screens or surfaces.

Screens or surfaces 50 and 52 are disclosed in more detail in FIG. 7 wherein screen 52 contains a plurality of apertures 57 for permitting the electron beam to pass therethrough to scan screen 50. The apertures in the screen 52 are sufficiently small so as not to interfer with the image pattern formed thereon. FIG. 7 discloses, in dotted lines, a third image producing means including screen 60 which is similar in construction to screen 50. Screen 58, closest to the observer, is included to reinforce the three dimensional sensation created by screens 50 and 52. As indicated above with regard to the composite film transparency, the preferred spacing between the light image forming surfaces is approximately one-eighth to one-half inch depending on acceptable off axis viewing angle.

Still another embodiment of the subject invention is disclosed in FIG. 8 wherein a television display 61 is illustrated including a phosphor coated screen 62 which is scanned by an electron beam produced by cathode means 64 in response to a video signal processed through an electron beam scanning circuit 66. Television display 61 also includes a second screen 68 of the planar image display type such as a liquid crystal or gas pockel screen. Screen 68 is activated in response to the same video signal as screen 62 by means of a driver circuit 70 illustrated in block form in FIG. 8. Screen 68 differs from prior art screens by the provision of a plurality of small transparent areas positioned throughout the screen in a manner to permit the image formed by screen 62 to be perceived by an observer position in front of television display 61. Additional screens may be positioned in front of screen 62 to reinforce the stereoscopic effect. Alternatively, the front screens may be sensitive to electron beam excitation as in FIG. 6 and the scanning means may include a corresponding number of cathode electron beam sources adapted to respond to the same video signal.

Figure 9:
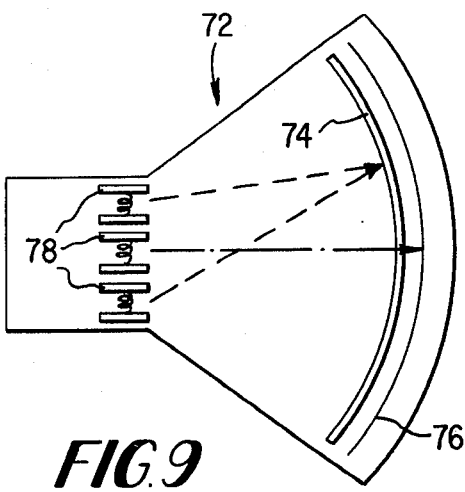
FIG. 9 is a cross sectional view of a television tube including a three color display screen incorporating features of the subject invention.

FIG. 9 discloses an additional embodiment of the subject invention adapted for three color television display, including a cathode ray tube CRT 72 having a composite color screen. CRT 72 includes a first screen to including a three color continuous tone coating with apertures in between for permitting the scanning beam to pass through the screen 76 placed in front of screen 74. Screen 76 may be a half-tone (48 lines per inch) black and white or color phosphor coated screen. Note also that CRT 72 includes three separate cathode ray sources 48 for scanning screen 74 in response to a color video signal. A fourth cathode ray source may be provided to scan screen 76.

Figure 10:
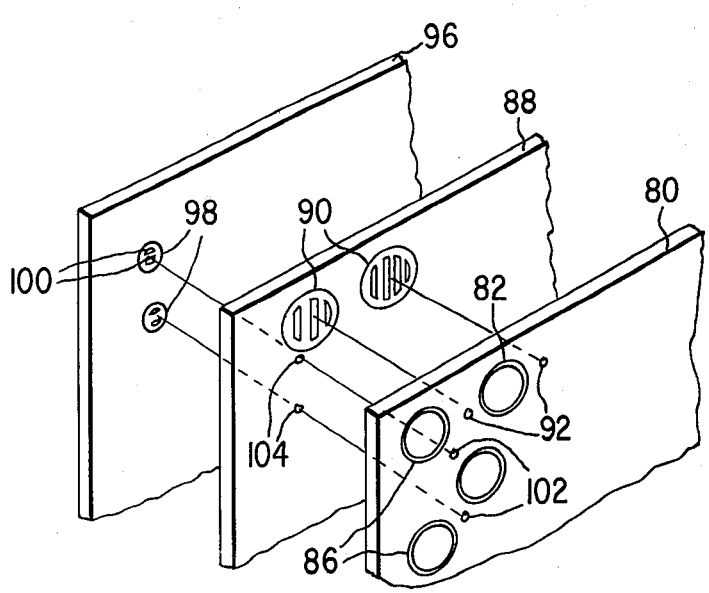
FIG. 10 is an exploded view of a multi-screen arrangement for pseudostereoscopic image display.

FIG. 10 illustrates yet another embodiment of the subject invention wherein three electron beam activated screens are employed to produce a stereoscopic effect from a single video signal. Screen 80 includes a pattern of phosphor elements including red elements 82, green elements 84 and blue elements 86. A second screen 88 spaced forward of screen 80 includes a plurality of phosphor elements 90 which may also include elements emitting three separate colors as in the case of screen 80. Each element 90 is positioned directly in front of corresponding apertures 92 contained in screen 80 whereby the electron beam which scans screen 80 will also scan elements 90 of screen 88. Note that elements 90 may include a line gradient configuration 94 to produce a line gradient image similar to the line gradient of the composite transparencies of FIGS. 1-5. A third screen 96 is positioned in front of screen 88. Screen 96 contains a black and white half-tone phosphor pattern on transparent glass including a plurality of phosphor dots 98 having line gradients 100 similar to line gradient 94 of phosphor elements 90. Dots 98 are aligned with apertures 102 in screen 80 and corresponding apertures 104 in screen 82 which thereby permits electron beam excitation of dots 98 from a position behind screens 80 and 88. As in other embodiments of this invention, screens 88 and 96 are transparent to images formed on the rearwardly positioned screens.

Alternatively, the phosphor elements of screen 80 may be formed in strips of recurring three colors divided by transparent areas containing apertures aligned with strips of phosphor on screen 88.

While the subject invention has been disclosed with specific reference to composite transparencies and television display, the invention may also have application in slide projection wherein parallel axially spaced screens would receive identical light images for simultaneous viewing to give a stereoscopic effect.

I claim:

1. Apparatus for producing a pseudostereoscopic light image when viewed from a predetermined viewing area, comprising
   a. first image producing means for directing a first light pattern corresponding to said image toward the viewing area, said first image producing means including a first generally planar surface having said image permanently recorded therein, and
   b. second image producing means for directing a second light pattern toward the predetermined viewing area, said second image producing means including a second generally planar surface positioned forward of, parallel to and in axial alignment with said first generally planar surface, said second generally planar surface including at least one portion of said image permanently recorded in an area axially aligned with a corresponding portion of said image recorded on said first generally planar surface and further including a transparent area axially aligned with the remaining corresponding portion of said image recorded on said first generally planar surface, said second planar surface permitting the first light pattern to pass therethrough to said predetermined viewing area, whereby a three dimensional sensation is created when said first and second patterns are visually integrated.

2. Apparatus as defined in claim 1, wherein each said generally planar surface includes a continuous tone photographic film transparency.

3. Apparatus as defined in claim 2, further including light means for projecting a beam of light through said film transparencies to cause said first and second surfaces to emit predetermined light images.

4. Apparatus as defined in claim 2, wherein said film transparencies are each less than normal density and contrast.

5. Apparatus as defined in claim 1, wherein said first generally planar surface includes a continuous tone photographic film transparency, and wherein said second generally planar surface includes a line gradient photographic film transparency containing a plurality of spaced strips, each said strip containing visual information identical to the visual information contained in corresponding areas of said continuous tone film transparency.

6. Apparatus as defined in claim 1, wherein said first generally planar surface includes a continuous tone film transparency, and wherein said second generally planar surface includes a half-tone film transparency.

7. Apparatus as defined in claim 5, wherein said continuous tone film transparency contains a color image.

8. A composite pseudostereoscopic film transparency for producing a simulated three-dimensional image sensation when perceived within a predetermined viewing area, comprising a. light means for directing a beam of light toward the predetermined viewing area;
   b. first means for forming a light pattern containing visual information in two-dimensional form, said first means including a first film transparency positioned within the light beam formed by said light means, said film transparency containing a two-dimensional photographic reproduction of the desired image recorded from a first predetermined position; and
   c. second means for modifying the image created by said first means to produce a three dimensional image sensation, said second means including at least one line gradient film transparency containing a plurality of spaced strips, each strip containing photographically recorded visual information identical to the visual information contained in corresponding areas of said first film transparency of said first means, said line gradient film transparency being parallel to and positioned forward of and in axial alignment with said first film transparency, said line gradient film transparency permitting the light passing through said first film transparency to pass through said line gradient film transparency, whereby a three dimensional sensation is created when the light pattern emerging from said second means is visually perceived by a viewer positioned within said predetermined viewing area.

9. Apparatus as defined in claim 8, wherein said first film transparency is a continuous tone positive.

10. Apparatus as defined in claim 9, wherein said first means for forming a light pattern includes a second film transparency in the form of a less than normal density continuous tone positive, and further wherein said first film transparency is also less than normal density.

11. Apparatus as defined in claim 8, wherein said second means includes a second line gradient film transparency containing a plurality of spaced strips, each strip containing visual information identical with visual information contained in corresponding areas of a two-dimensional reproduction of the desired image photographically recorded from a second predetermined position laterally displaced with respect to said first predetermined position.

12. Apparatus as defined in claim 11, wherein said first and second line gradient film transparencies contain 30 to 50 strips per inch of film.

13. Apparatus as defined in claim 11, wherein said strips of said first and second line gradient film are arranged horizontally with respect to the desired images.

14. Apparatus as defined in claim 11, wherein said film transparencies are parallel and axially spaced by a distance from one-eighth to one-half inch.

15. Apparatus as defined in claim 14, wherein said film transparencies are each mounted on ⅛ inch thick transparent sheets which are secured together to form a composite.

16. Apparatus as defined in claim 11, wherein said first means includes a second film transparency and wherein said first and second film transparencies are each a gradient film transparency containing a plurality of spaced strips, each strip containing information identical to the visual information contained in corresponding areas of the desired image, said film transparencies of said first and second means having graduated densities relative to each other, the forward film transparency being the least dense and the rear film transparency being the most dense, the densities of said transparencies being additive to approximate the normal density of the desired image.

* * * * *